United States Patent Office 3,663,598
Patented May 16, 1972

3,663,598
PHTHALATE ESTERS
Joseph A. Vasta, Woodbury, N.J., assignor to E. I. du Pont de Nemours and Company, Wilmington, Del.
No Drawing. Filed Apr. 2, 1968, Ser. No. 718,246
Int. Cl. C07c 69/80
U.S. Cl. 260—475 P                                    1 Claim

ABSTRACT OF THE DISCLOSURE

Compound of the formula

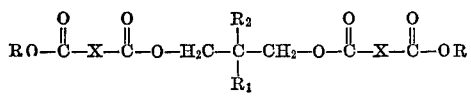

where

R is an alkyl group or a cyclohexyl group,
$R_1$ is hydrogen or an alkyl group,
$R_2$ is —OH or —CH$_2$OH, and
X is the residue from phthalic acid, maleic acid, or succinic acid, and coating compositions containing these compounds.

SUMMARY OF THE INVENTION

This invention relates to phthalate esters. It is more particularly directed to esters of the formula (1) 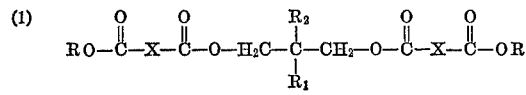

where

R is an alkyl group of 1 through 18 carbon atoms or a cyclohexyl group;
$R_1$ is hydrogen or an alkyl group of 1 through 8 carbon atoms;
$R_2$ is —OH or —CH$_2$OH, and
X is

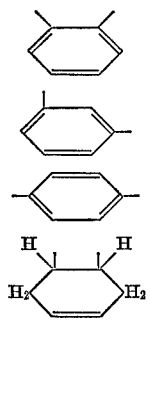

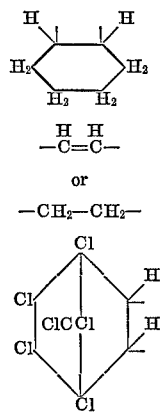

UTILITY

The compounds of the invention are useful as film-forming components in coating compositions. When formulated with suitable liquid carriers and cross-linking resins such as aminoplasts or epoxies, they give thermosetting coating compositions which provide tough, durable finishes.

The compounds are also compatible with other conventional film-forming materials such as acrylics, alkyds, epoxies, aminoplasts, vinyl resins, polyurethanes and drying oils. These compounds are not only compatible with conventional film-formers, but surprisingly can be included in coating compositions containing these film-forming materials in amounts up to 50% (by weight of the film-forming component) without sacrificing or diluting the inherent stain resistance, heat resistance, hardness, adhesion, flexibility and resistance to corrosion of finishes derived from the compositions.

Moreover, use of the compounds of the invention with conventional film-forming materials decreases the compositions' viscosities. This makes it possible to prepare paints with higher solids content, which means that more paint can be sprayed per pass. In addition, use of the compounds of the invention in such paints makes them more package stable at elevated temperatures.

The compound of the invention preferred for use as a film-forming material is one of Formula 1 where R is

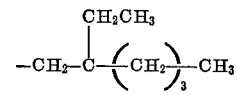

$R_1$ is —CH$_2$CH$_3$
$R_2$ is —CH$_2$OH, and
X is

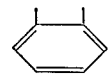

This preferred compound is even more preferably used as an extender in the coating compositions described in U.S. Pat. 3,366,706 and U.S. Pat. 3,330,814, which are incorporated into this application only to describe such coating compositions, particularly the film-forming materials used.

PREPARATION OF THE COMPOUNDS

The compounds of the invention are made in two steps. In the first, unimolar portions of a monohydric alcohol and a dibasic acid or a dibasic acid anhydride are reacted at 150° C.–220° C. for from 1 to 2 hours. If an acid is used, a small amount of an organic liquid such as xylene should be added to the reaction mixture to remove the water given off.

To this reaction mixture is then added ½ mol of a triol. The reaction mass is stirred and its temperature is raised to 205° C.–235° C. and held there for from 5 to 10 hours. This reaction time can be cut to 2–6 hours by using from 0.01 to 0.5% (by weight) of an esterification catalyst such as dibutyl tin oxide. The reaction is carried to an acid number of less than 4, preferably about 2.

The product is a viscous liquid, generally water white to straw colored, soluble in most organic solvents.

Illustrative of the reactants which can be used to prepare the compounds of the invention are:

Monohydric alcohol 2-ethylhexyl alcohol
Methanol
Ethanol
Isopropanol
Octyl alcohol
Lauryl alcohol
Stearyl alcohol
Cyclohexanol Dibasic acid Phthalic
Isophthalic
Terephthalic
Tetrahydrophthalic
Hexahydrophthalic
Hexachloroendomethylenetetrahydrophthalic
Maleic
Succinic Triol Trimethylolethane
Trimethylolpropane
Glycerol

PREPARATION OF COATING COMPOSITIONS

Coating compositions can be prepared using the compounds of the invention by first preparing a mill base using conventional sand-grinding or ball-milling techniques in which a pigment is dispersed in a small amount of suitably thinned compound of the invention and then milled.

To this mill base are then added from 40% to 85% (by weight of the binder [1]) of the compound of the invention and from 15% to 60% (by weight of the binder) of a suitable conventional cross-linking resin such as an aminoplast or an epoxy. The pigment/binder ratio in the compositions can range from 1–200/100.

The resulting compositions can be thinned to application viscosity with such materials as xylene or xylene/butanol mixtures. Conventional fillers and plasticizers, and other film-forming components, can be added to the compositions in the usual amounts.

These compositions can be applied to primed or unprimed substrates by brushing, dipping, roller-coating, etc. The substrates are then baked at temperatures ranging from 105° C.–205° C. for from 15 minutes to 1 hour.

When a compound of the invention is used as an extender in a coating composition, it can be added directly to the finished composition or can be added at any stage during the composition's manufacture. For this use, the compound can be added at a concentration of up to about 50% (by weight of the film-forming component) without sacrificing or diluting the properties of the resulting finish. Concentrations of from about 50% up to total replacement of the film-former is of course possible if one is willing to accept the slight dilution effect.

DESCRIPTION OF PREFERRED EMBODIMENTS

The invention will be more easily understood and readily practiced by referring to the following illustrative examples, in which all parts are by weight unless otherwise indicated.

---

[1] Binder is compound of the invention plus whatever resin is used.

The examples are intended to be illustrative only and are not to be construed as limiting in any way. As those skilled in the art will appreciate, numerous variations can be composed on these themes without departing from the scope or spirit of the invention.

EXAMPLE 1

To a reactor were added 349 parts of 2-ethylhexyl alcohol and 306 parts of phthalic anhydride. The mixture was stirred and heated to 135° C.; an exotherm thereupon began and the temperature rose to 150° C. The mixture was held at this temperature for 1 hour.

At this point, 160 parts of trimethylolpropane, 2 parts of dibutyl tin oxide and 25 parts xylene were added. The mixture was then heated to reflux temperature and held there until the mixture had an acid number of 4. Water was removed continuously from the reaction mass. The resulting product was a viscous, straw-colored liquid containing 94% solids.

In place of the phthalic anhydride, 2-ethylhexyl alcohol and trimethyl propane one can use equivalent weights of the monohydric alcohols, triols and acids in the list appearing under the heading "Preparation of Compounds" to get the corresponding compounds of the invention.

EXAMPLE 2

One hundred eighty parts of rutile $TiO_2$, 60 parts of the compound prepared in Example 1, 45 parts of xylene and 15 parts of n.butanol were mixed and then sand ground to give a dispersion of pigment particles whose average diameter is about 0.5 mil.

To 167 parts of this dispersion were added 26 parts of the compound of Example 1 and 93 parts of melamine-formaldehyde resin (55% solution in n.butanol). The mixture was stirred and then reduced to application viscosity with xylol. It was sprayed on a conventionally primed steel panel to a thickness of 1 mil (dry) and then baked for 20 minutes at 140° C.

The resulting white finish was glossy, flexible and hard with excellent resistance to solvents, food stains and heat.

EXAMPLE 3

To 167 parts of the mill base prepared in Example 2 were added 2 parts of the compound of Example 1, 60 parts of a resin solution prepared as in Example 1 of U.S. Pat. 3,330,814 and 73 parts of the melamine-formaldehyde resin solution used in Example 2.

This mixture was stirred and then applied as described in Example 2 to give a hard, durable finish having substantially the same properties as a finish obtained from the same composition lacking the compound of Example 1.

EXAMPLE 4

To 167 parts of the mill base prepared in Example 2 were added 14 parts of the compound of Example 1, 55 parts of a resin solution prepared as in Example 3 of U.S. Pat. 3,366,706 and 54 parts of ureaformaldehyde resin (55% solution in n.butanol).

This mixture was stirred and then applied as described in Example 2 to give a hard, durable white finish with excellent resistance to food stains and heat, suitable as a finish for kitchen cabinets.

It should be understood that any compound of the invention can be substituted for those used in Examples 3 and 4, with substantially the same results.

I claim:

1. A compound of the formula $$CH_3-(CH_2)_3-\underset{\underset{}{CH_2CH_3}}{CH}-CH_2-O-\underset{\underset{}{O}}{C}-\underset{}{\bigcirc}-\underset{\underset{}{O}}{C}-O-CH_2-\underset{\underset{}{CH_2CH_3}}{\overset{CH_2OH}{C}}-CH_2-O-\underset{\underset{}{O}}{C}-\underset{}{\bigcirc}-\underset{\underset{}{O}}{C}-O-CH_2-\underset{\underset{}{CH_2CH_3}}{CH}-(CH_2)_3-CH_3$$

(References on following page)

References Cited

UNITED STATES PATENTS

| | | | |
|---|---|---|---|
| 1,835,915 | 12/1931 | Swallen et al. | 260—475 |
| 1,951,593 | 3/1934 | Bradley | 260—475 |
| 2,063,239 | 12/1936 | Gabriel | 134—26 |
| 3,028,352 | 4/1962 | Hecker et al. | 260—475 |
| 3,459,733 | 8/1969 | Byrd et al. | 260—485 |

LORRAINE A. WEINBERGER, Primary Examiner

E. J. SKELLY, Assistant Examiner

U.S. Cl. X.R.

106—252; 260—67.6 R, 468 R, 468 B, 485 G